United States Patent [19]
Springstead et al.

[11] Patent Number: 5,919,586
[45] Date of Patent: Jul. 6, 1999

[54] TOED-IN ANODE CAN AND ELECTROCHEMICAL CELL MADE THEREWITH

[75] Inventors: John Claude Springstead, Mazomanie; John Edward Oltman, Mount Horeb, both of Wis.

[73] Assignee: Rayovac Corporation, Madison, Wis.

[21] Appl. No.: 08/827,557

[22] Filed: Mar. 28, 1997

[51] Int. Cl.[6] .............................. H01M 2/02; H01M 2/08
[52] U.S. Cl. .................. 429/164; 429/171; 429/174; 429/185
[58] Field of Search ................................ 429/177, 175, 429/176, 27, 163, 185, 164, 171, 174

[56] References Cited

U.S. PATENT DOCUMENTS

| | | | |
|---|---|---|---|
| 4,238,555 | 12/1980 | Uetani et al. ............................ | 429/163 |
| 4,256,815 | 3/1981 | Smilanich et al. ...................... | 429/185 |
| 4,419,420 | 12/1983 | Ishizaki .................................. | 429/185 |
| 5,279,905 | 1/1994 | Mansfield, Jr. et al. ................ | 429/27 |
| 5,576,117 | 11/1996 | Morita et al. ........................... | 429/162 |
| 5,582,932 | 12/1996 | Oltman et al. .......................... | 429/176 |
| 5,591,541 | 1/1997 | Oltman .................................... | 429/171 |
| 5,804,327 | 9/1998 | Oltman .................................... | 429/27 |

*Primary Examiner*—Maria Nuzzolillo
*Assistant Examiner*—Jonathan Crepeau
*Attorney, Agent, or Firm*—Thomas D. Wilhelm

[57] ABSTRACT

This invention pertains to electrochemical cells, and anode cans used therein, wherein edge regions of respective anode cans are toed-in. The anode can includes a top wall, and a first side wall depending downwardly from the top wall. The first side wall has an edge region remote from the top wall. The first side wall comprises a curl at the edge region. The edge region comprises a first portion of the first outer surface on the curl. The first portion of the first outer surface is displaced from a first downward projection of the first outer surface of the first side wall as defined at a maximum perimeter element of the intermediate region. Thus, the edge region is toed-in. Generally, the first side wall follows a path from an intermediate element of the first side wall to a bottom edge of the first side wall, and a reverse curl extending from the bottom edge toward the top wall. The cathode can has a bottom wall, and a second side wall extending upwardly from the bottom wall. A seal is disposed between the anode can and the cathode can.

39 Claims, 4 Drawing Sheets

TOED-IN ANODE CAN AND ELECTROCHEMICAL CELL MADE THEREWITH

BACKGROUND

This invention relates to button-size electrochemical cells, and especially to metal-air cells of the zinc-air type. Such cells are used for a variety of applications. A large fraction of such cells are used in hearing aids. Newer versions of such hearing aids are placed inside the outer portion of the human ear, whereby any leakage of material from the cell may come into contact with the skin of the wearer, in the wearer's ear. Accordingly, it is critical that such cells not leak any of the alkaline electrolyte which is routinely used in such cells.

Further, to the extent such leakage is detected in the manufacturing process, quality control efforts must be expended to reduce or preferably eliminate such leakage wherever practical. Such quality control efforts, of course, bear associated costs. Therefore, any advance in reducing leakage of electrolyte is significant to the health of the consumer of such cells, as well as to the commercial value of such cells to the manufacturer.

Further, the overall volume of the void space inside the cell, useful for containing electrochemically reactive materials, is limited to that space not occupied by non-reactive components of the cell. Thus, to the extent use of internal void space by non-reactive components can be controlled or reduced, additional electrochemically reactive material may be used in the cell, and the use life of the cell thereby extended. Accordingly, any effort expended in controlling leakage must be accompanied by a sensitivity to any reduction in the space which is available for use in containing electrochemically reactive materials in the anode can.

One potential source of leakage is leakage past the seal which separates side walls of the anode can and the cathode can. Such seal must participate in the equivalent of a frictional engagement with both side walls and associated sealing fluids, or other materials, in order to successfully provide the necessary seal function. Such frictional engagement with the anode can is routinely obtained by a sliding assembly of the anode can and the seal to each other, wherein, in conventional such assemblies, the (plastic) seal may be damaged by the anode can. Such damage is difficult to detect, and thus such damaged cells may well leave the manufacturing facility undetected.

Further, during final assembly of the cell, pressure exerted by the distal edge of the anode can against the seal, and indirectly against the underlying cathode assembly, causes that portion of the cathode assembly which is disposed inwardly of the seal to rise toward the top wall of the anode can (doming), and thus to somewhat withdraw from its location adjacent the bottom wall of the cathode can. Such doming is desirable to the extent it facilitates formation of an adequately-sized air reservoir between the cathode assembly and the bottom wall of the cathode can. However, the amount of doming corresponds with a respectively reduced amount of the anode volume being available for receiving and containing electrochemically reactive anode material in the anode can. Therefore, it is highly desirable to configure the respective elements of the cell, in cooperation with the assembly process, so as to closely control doming of the cathode assembly toward the top wall of the anode can to accommodate efficient formation of the air reservoir while minimizing the amount of the anode volume which is thus occupied by such movement of the cathode assembly during the cell assembly process.

It is an object of this invention to provide improved anode cans, and electrochemical cells made therefrom, wherein the cells have less tendency to leak electrolyte, and wherein a high fraction of the anode void volume of a conventional anode can is retained while improving control of doming of the cathode assembly.

It is another object to provide an anode can having a normal full-size perimeter over the major portion of the side wall of the anode can, and a reduced perimeter edge region adjacent the distal edge thereof.

Yet another object is to provide an anode can wherein the outer surface of the edge region of the anode can side wall is displaced inwardly of the outer surface of the anode can side wall as defined at locations away from the edge region.

A further object is to provide an anode can wherein the edge region is displaced inwardly of an intermediate region of the side wall of the anode can, and wherein the average thickness of the side wall between the intermediate region and a distal edge of the side wall is twice the thickness of the side wall in the intermediate region.

It is still another object to provide electrochemical cells made with the above anode cans.

SUMMARY

Some of the objects are obtained in an electrochemical cell comprising an anode, a cathode, and a seal between the anode and the cathode. The anode includes an anode can, and electrochemically reactive anode material in the anode can. The anode can includes a top wall, and a first side wall depending downwardly from the top wall. The first side wall has an outer surface, and an edge region remote from the top wall.

The cathode includes a cathode can, and a cathode assembly inside the cathode can. The cathode can has a bottom wall, and a second side wall extending upwardly from the bottom wall, the second side wall having an inner surface.

The first side wall of the anode can is received inside the second side wall of the cathode can. In some embodiments, the first outer surface of the anode can, at the edge region, is displaced inwardly of the first outer surface as defined at locations away from the edge region. Thus, in these embodiments, the clearance between the first and second side walls at the edge region is greater than the clearance between the first and second side walls at locations away from the edge region.

Further to these embodiments, the first side wall includes an intermediate region associated with a first portion of the anode can having a full-size cross-section, between the top wall and the edge region. The edge region provides a second portion of the anode can having a reduced-size cross-section.

In other embodiments, the first outer surface of the anode can, at the edge region, is displaced outwardly of the first outer surface as defined at locations away from the edge region. In these embodiments, the clearance between the first and second side walls at the edge region is greater than the clearance between the first and second side walls at locations away from the edge region.

Further to these embodiments, the first side wall includes an intermediate region associated with a first portion of the anode can having a full-size cross-section, between the top wall and the edge region. The edge region provides a second portion of the anode can having a reduced-size cross-section.

The anode and cathode are joined together with the seal between the first and second side walls and, in combination, defining a top and a bottom of the cell, and a height therebetween. The second side wall defines a maximum perimeter of the electrochemical cell. The cell height and the maximum perimeter, in combination, define an overall volume of the cell. An anode volume is defined inwardly of the first side wall.

The fraction of the anode volume defined by the second portion is small compared to the fraction of the anode volume defined by the first portion, such that the toed-in edge region of the first side wall provides improved interaction with the seal and the cathode assembly while retaining an increased percentage of the anode volume associated with an anode can wherein the entirety of the first side wall is associated with a full-size cross-section.

Where the overall volume of the cell is about 0.50 cm$^3$ to about 0.60 cm$^3$, at least about 97%, preferably at least about 98%, more preferably at least about 99%, most preferably at least about 99.5%, of the anode volume is retained in combination with the curled toed-in structure of the invention.

Where the overall volume of the cell is about 0.20 cm$^3$ to about 0.30 cm$^3$, at least about 96%, preferably at least about 97.5%, more preferably at least about 98.5%, most preferably at least about 99%, of the anode volume is retained in combination with the curled toed-in structure of the invention.

Where the overall volume of the cell is about 0.12 cm$^3$ to about 0.20 cm$^3$, at least about 94%, preferably at least about 96%, more preferably at least about 98%, most preferably at least about 99%, of the anode volume is retained in combination with the curled toed-in structure of the invention.

Where the overall volume of the cell is about 0.06 cm$^3$ to about 0.12 cm$^3$, at least about 92%, preferably at least about 95%, more preferably at least about 97%, and most preferably at least about 98.5%, of the anode volume is retained in combination with the curled toed-in structure of the invention.

In some embodiments, the outer surface at the edge region is displaced inwardly, or outwardly, a distance less than the thickness of the substrate of which the first side wall is comprised.

In preferred embodiments, the first outer surface at the edge region is displaced either inwardly or outwardly a distance of about 0.025 mm (0.001 inch) to about 0.203 mm (0.008 inch), preferably about 0.038 mm (0.0015 inch) to about 0.15 mm (0.006 inch).

In preferred embodiments, the thickness of the side wall structure, between inner and outer surfaces thereof, is about 0.075 mm (0.003 inch) to about 0.250 mm (0.010 inch), preferably about 0.090 mm (0.0035 inch) to about 0.150 mm (0.006 inch), more preferably about 0.114 mm (0.0045 inch) to about 0.140 mm (0.0055 inch).

Preferably, the structure of the first side wall comprises a first surface layer comprising nickel, a second opposing surface layer comprising copper, and a third substrate layer, preferably stainless steel, between the first and second surface layers.

It is preferred that the outer surface of the first side wall at the edge region be displaced either inwardly or outwardly of an intermediate region of the first side wall, between the top wall and the edge region, a distance less than the thickness of the structure of the material used to fabricate the first side wall.

In preferred embodiments, the thickness of the first side wall between the intermediate region and the distal edge is less than twice the thickness of the first side wall in the intermediate region. In this regard, the scope of "thickness" of the side wall, wherever used, including in the claims which follow, does, at any given location on the first side wall, include multiple layers of the side wall structure, such as a second element of the side wall structure folded back onto a first element of the side wall structure as in a reverse curl.

The invention is not limited in its application to the details of construction and the arrangement of the components set forth in the following description or illustrated in the drawings. The invention is capable of other embodiments or of being practiced or carried out in various ways. Also, it is to be understood that the terminology and phraseology employed herein is for purpose of description and illustration and should not be regarded as limiting. Like reference numerals are used to indicate like components.

DESCRIPTION OF THE ILLUSTRATED EMBODIMENTS

Figure 1:
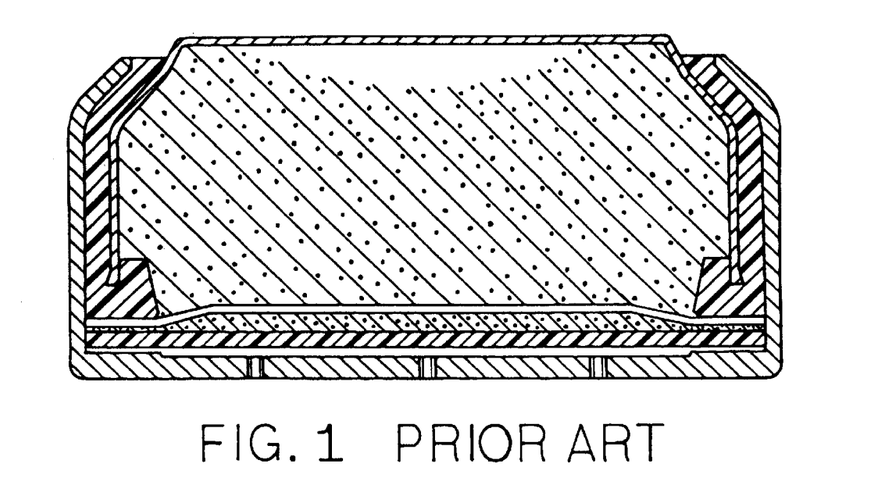
FIG. 1 shows a prior art button cell wherein the edge region of the anode can extends generally straight down from the intermediate region.
Figure 2:
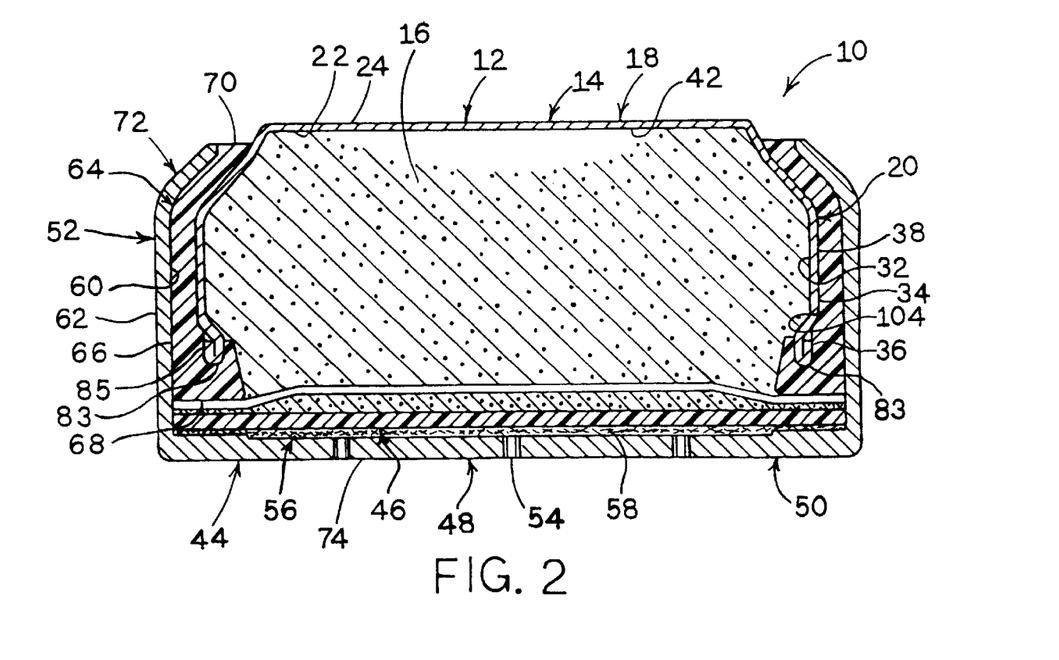
FIG. 2 shows a button cell of the invention wherein the edge region of the anode can is toed-in and reverse curled.

Referring now by characters of reference to the drawings, a comparison of FIGS. 1 and 2 illustrates the general concept of the invention. Referring first to FIG. 2, and specifically to the cell 10, the negative electrode 12, also referred to as the anode 12, includes an anode can 14 and electrochemically reactive anode material 16 contained therein.

Anode can 14 has a top wall 18, and circumferential downwardly-depending side wall 20. Top wall 18 includes an inner surface 22 and an outer surface 24. Side wall 20 has an inner surface 32 and an outer surface 34. Side wall 20 includes an edge region 36 remote from top wall 18, and an intermediate region 38 between edge region 36 and top wall 18. Top wall 18 and side wall 20 generally define a cavity 42, defining an anode volume, within the anode can, which cavity 42 contains the anode material 16.

Positive electrode 44, also referred to as the cathode 44, includes a cathode assembly 46, contained within cathode can 48. Cathode can 48 has a bottom 50, and a circumferential upstanding side wall 52 extending upwardly from bottom 50. A plurality of air ports 54 extend through bottom 50 of the cathode can, providing avenues for transport of oxygen into the cell adjacent cathode assembly 46. An air reservoir 56 spaces cathode assembly 46 from bottom 50 and the corresponding port or ports 54. A porous diffusion layer 58 fills air reservoir 56. Side wall 52 of the cathode can has an inner surface 60 and an outer surface 62.

Anode 12 is electrically insulated from cathode 44 by seal 64. Seal 64 includes a generally cylindrical, circumferential side wall 66 disposed between upwardly extending side wall 52 of the cathode can and downwardly-depending side wall 20 of the anode can, a seal foot 68 disposed generally between bottom edge 83 of the anode can and cathode assembly 46, and a seal top 70 where side wall 66 of seal 64 extends from between side walls 20 and 52 adjacent the top of the cell.

Outer surface 72 of cell 10 is thus defined by outer surface 24 of top wall 18 of the anode can, outer surface 62 of side wall 52 of the cathode can, outer surface 74 of bottom 50 of the cathode can, and top 70 of seal 64.

Figure 3:
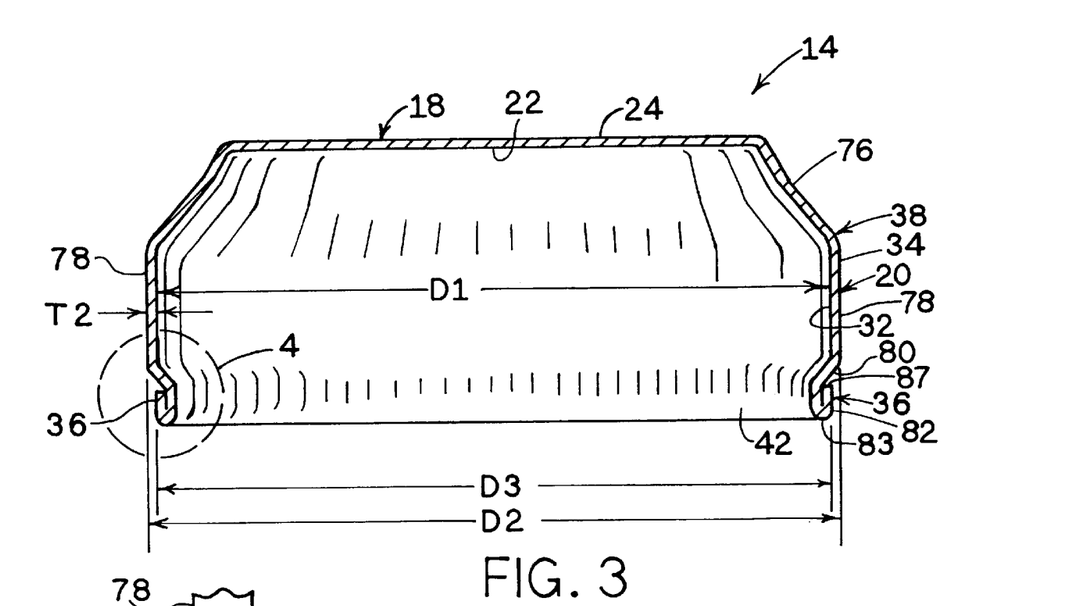
FIG. 3 shows an anode can of the invention having a toed-in, reverse curled, edge region, as used to make the button cell of FIG. 2.
Figure 4:
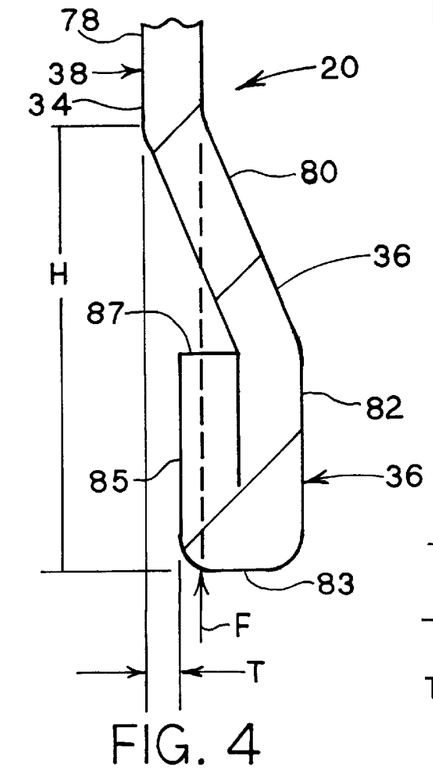
FIG. 4 shows a fragmentary enlarged view of the edge region of the anode can of FIG. 3, and is taken in FIG. 3 at the dashed circle "4."

Addressing a more detailed description of certain ones of the elements, and referring now to FIGS. 3 and 4, side wall 20 depends generally downwardly from top wall 18, and terminates in bottom edge 83. Side wall 20 generally comprises two regions, namely edge region 36 remote from top wall 18, and intermediate region 38 which is disposed between edge region 36 and top wall 18.

As illustrated, intermediate region 38 includes an expanding element 76, and a maximum perimeter element 78, depicted as a maximum circumference element. Expanding element 76 extends from top wall 18 along a path of generally expanding perimeter to the locus on side wall 20 where the perimeter/circumference of the side wall generally reaches its maximum dimension, at element 78. Maximum perimeter element 78 thus extends from expanding element 76 to edge region 36.

Edge region 36 is generally defined as that portion of side wall 20 which is displaced inwardly from the inner surface of intermediate region 38 at maximum dimension "D1" of the side wall at maximum perimeter element 78. Thus, edge region 36, as illustrated, includes an inwardly extending abutment element 80, extending inwardly toward the interior of the anode can, constant circumference element 82, and bottom edge 83.

Constant circumference element 82 has a generally constant inner circumference extending along a path between inwardly extending abutment element 80 and bottom edge 83. Constant circumference element 82 further comprises a curl element 85 extending from bottom edge 83 toward intermediate region 38, and thus toward top wall 18.

Figure 3A:
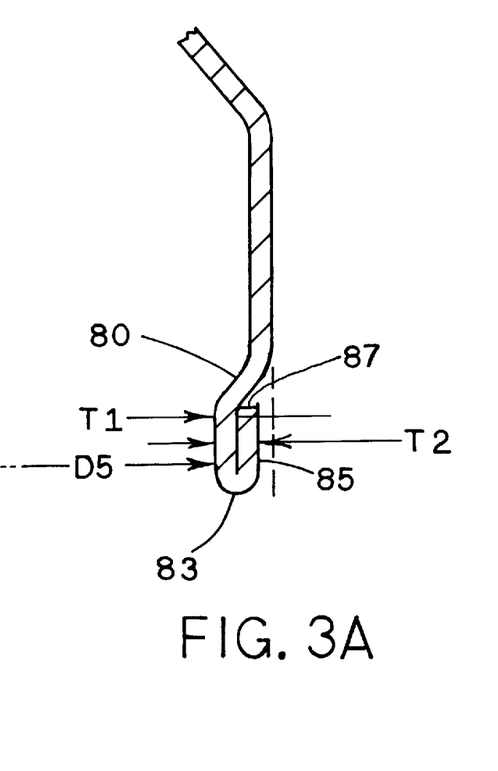
FIGS. 3A and 3B are fragmentary cross-sections, showing first and second embodiments of the side wall of the anode can of FIG. 3.

The cells illustrated in the drawings represent round button cells. Referring to FIGS. 3 and 3A, the amount of toe-in, namely the difference between outer diameter "D2" at the maximum outer diameter of the anode can in the intermediate region and toed-in outer diameter "D3" at the constant circumference portion of the edge region is typically about 0.025 mm (0.001 inch) to about 0.203 mm (0.008 inch). Preferred toe-in amount ranges from a displacement of about 0.038 mm (0.0015 inch) inwardly from the outer surface of intermediate region 38, all around the anode can, such that outer diameter "D3" of the anode can at constant circumference element 82 is less than outer diameter "D2" at the intermediate region by about 0.076 mm (0.003 inch), to a displacement of about 0.102 mm (0.004 inch) inwardly from the outer surface of intermediate region 38, all around the anode can, such that outer diameter "D3" of the anode can at edge region 36 is less than outer diameter "D2" at the intermediate region by about 0.204 mm (0.008 inch).

As illustrated in the drawings, the invention comprehends using multiple layers of the material of side wall 20 at edge region 36 by using e.g. reverse curl element 85. Thickness "T2" of the side wall (FIG. 3A), as opposed to the thickness "T1" of the structure of the side wall, includes the multiple thicknesses "T1" of the respective multiple layers of the structure embodied in the reverse curl portion of the side wall.

Figure 5:
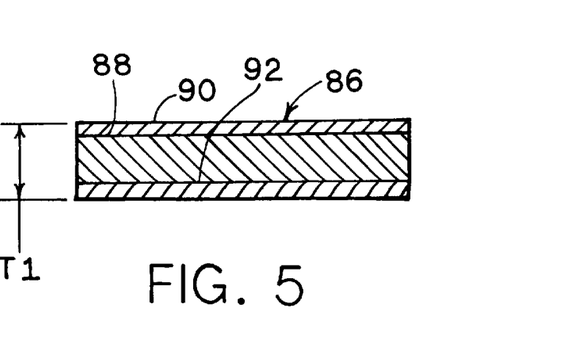
FIG. 5 shows a cross section of metal sheet structure useful in making anode cans of the invention.

In general, anode can 12 is fabricated from a strip of metal 86 having a multiple layer structure, generally as illustrated in FIG. 5. Anode can 12 is readily formed from e.g. a three layer structure 86 having a substrate core layer 88 of e.g. 304 stainless steel clad with a layer 90 of copper which is used for the inner surface of the anode can, and a layer 92 of nickel on the opposing surface of the stainless steel, the nickel being used for the outer surface of the anode can. In some embodiments, it is contemplated that additional layers may be used as desired between the stainless steel layer and the copper layer and/or between the stainless steel layer and the nickel layer.

In conventional metal strip material used to make anode cans, about 76 percent by volume of the metal structure is contained in the substrate layer 88 of stainless steel. About 16 percent by volume is contained in the surface copper layer 90. About 8 percent by volume is contained in the surface nickel layer 92. Accordingly, with all expressions being percent by volume represented by the respective layers, the structure can be expressed, layer for layer, as /16% Cu/76% SS/8% Ni/.

"Cu" is copper. "SS" is stainless steel. "Ni" is nickel. All expressions are percent by volume.

The strength of the above metal strip structure is provided by a combination of (a) the thickness of the structure, and (b) the combined strengths of the materials in the individual layers. Regarding materials, the stainless steel provides proportionately more structural strength for equal volumes of material, than the copper or the nickel. The fraction of the metal strip comprising the stainless steel layer can be increased, thus providing greater strength per unit of thickness, while maintaining suitable forming properties for forming anode cans and reducing the overall thickness of the three-layer metal structure.

Thus, a three-layer structure of the above nature, having the combination of suitable forming properties along with sufficient strength, stiffness, and crush resistance in the anode can, can be made into anode cans when the relative amounts of the layers 88, 90, and 92 are revised to increase the relative amount of the stainless steel layer 88. The following structures illustrate that the amount of stainless steel can be increased by up to about 20% over conventional structures, from 76% stainless steel to about 91% stainless steel. Exemplary such structures are:

/16% Cu/82% SS/2% Ni/

/7% Cu/91% SS/2% Ni/

The above two structures of metal strip 86, for making anode cans of the invention, are merely illustrative of structures within the range of structures which can be used wherein the common feature is the increase in the amount of the substrate stainless steel layer relative to the amount of the copper and/or the nickel layers. Accordingly, the volume of the copper layer can range from about 7% to about 16% of the volume of the three-layer metal structure, and the volume of the nickel layer can range from about 2% to about 7% of the volume of the three-layer metal structure. So long as the stainless steel content is increased above the conventionally known level of about 76%, the strength of the metal structure 86, for any given thickness, is improved. Thus, the metal structure 86 allows for reduction in thickness of the structure while maintaining the strength of the anode can.

Preferred steps in the development of structures having increasing amounts of the stainless steel layer, and thus higher strength/thickness ratio, produce anode cans having progressively, for example, 77% stainless steel, 80% stainless steel, 83% stainless steel, 87% stainless steel, and 91% stainless steel, with respective 20%, 17%, 13%, and 9% as the corresponding combined amounts of the copper and nickel layers 90 and 92. Preferred steps in development of metal structures 86 having decreasing amounts of the copper layer 90 are, for example, 15% copper, 11% copper, and 7% copper. Preferred steps in development of structures having decreasing amounts of the nickel layer 92 are, for example, 7% nickel, 6% nickel, 3% nickel, and 2% nickel. The full range of the structures described can be obtained from Sumitomo Metals Company, Japan.

Figure 6:
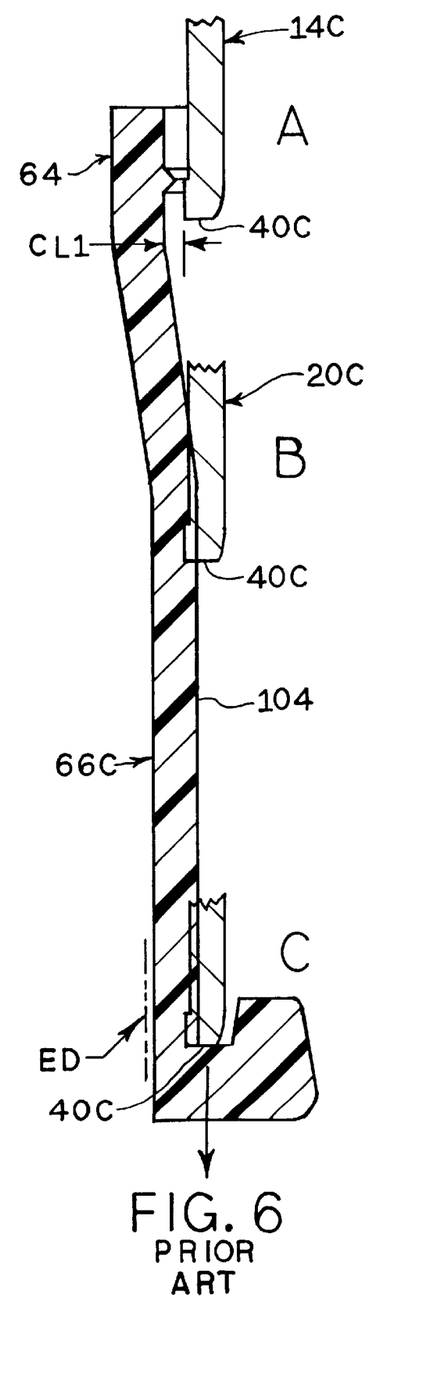
FIG. 6 is a fragmentary cross-section showing prior art assembly steps, for assembling an electrochemical cell, in which steps a side wall of the seal is assembled with a prior art anode can at the side wall of the anode can.
Figure 7:
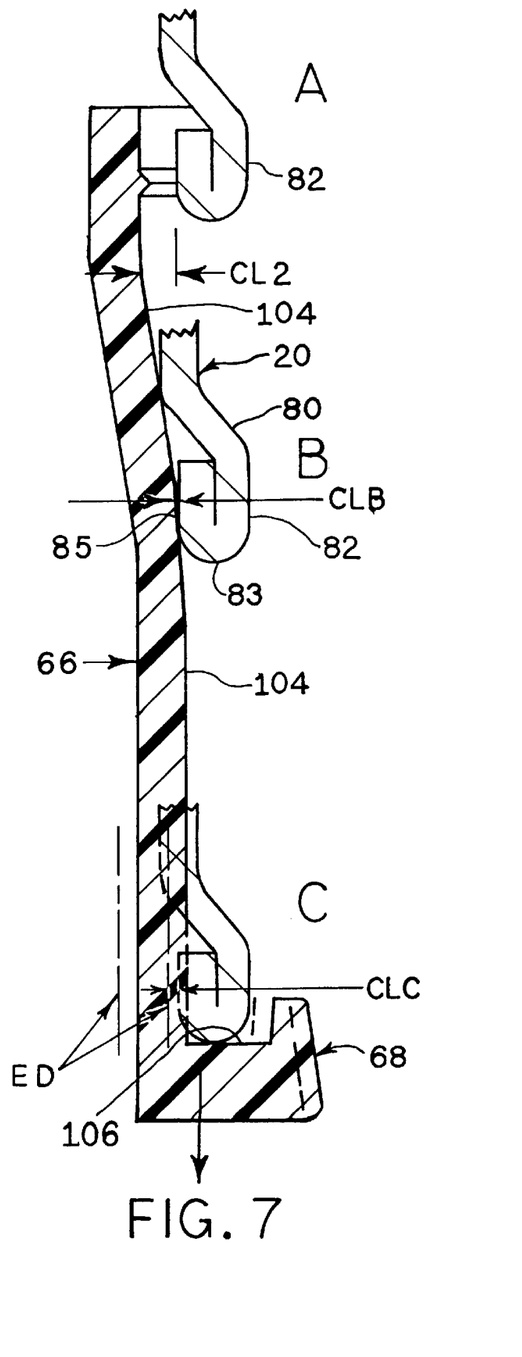
FIG. 7 is a fragmentary cross-section showing assembly steps of the invention, for assembling an electrochemical cell, in which steps a side wall of the seal is assembled with an anode can of the invention at the side wall of the anode can.

As suggested by the discussion of FIGS. 6 and 7 following, and elsewhere, the (reverse) curl at edge region 36 is important to advancing the anode can into the seal during assembly without damaging the seal. Where outer diameter "D3" is toed in from outer diameter "D2," the inward displacement of bottom edge 83 of the edge region from outer surface 34, inwardly of maximum outer diameter "D2," can provide clear spacing of the leading edge of the anode can, at curved bottom edge 83, away from inner surface 104 of side wall 66 of seal 64 during assembly of the anode can and the seal. Further, the reverse curl provides a less sharp leading edge at bottom edge 83, by virtue of the greater thickness of two layers of the metal strip, and displaces any burrs or other imperfections in cut free edge 87 away from the leading edge of the anode can thereby further reducing any potential that the anode can might cut the seal during assembly.

A short description of the use of anode cans of the invention illustrates the value of the toed-in feature to electrochemical cells of the invention. In assembling the various elements of a button cell to form a cell, in general, the anode and cathode are assembled separately as separate subassemblies. Then the anode and cathode are brought together in a cell assembly process wherein the anode material and electrolyte are added to the anode shortly before bringing the anode and the cathode together in final assembly and closure of the cell.

The creation of the cathode is conventional and thus bears no further discussion regarding novelty of the invention herein.

In creation of the anode, anode can 14 is assembled to seal 64. Proper assembly of anode can 14 and seal 64 requires a close and interfering fit between anode can 14 and seal 64. Such close and interfering fit is required in order to ensure eventual creation of such a good sealing of the electrochemical cell made therewith that leakage of electrolyte from the cell is avoided.

The toe-in of the outer diameter illustrated in e.g. FIGS. 3 and 3A provides continuous clearance between constant circumference element 82, including bottom edge 83, and side wall 66 of seal 64 throughout the process of assembling anode can 12 and seal element 64 to each other to form the anode subassembly. Referring to FIG. 6, a conventional anode can 14C is illustrated in three Stages "A," "B," and "C" of being joined with a seal 64. As seen in FIG. 6, as the distal edge 40C of the anode can enters the seal 64 in Stage "A" at the top of side wall 66, there is a clearance "CL1" between distal edge 40C of the can and inner surface 104 of side wall 64.

As the anode can progresses inwardly into seal 64 toward stage "B," distal edge 40C progresses correspondingly along inner surface 104 of side wall 66. At Stage "B," the diameter of the seal 64 is smaller than at Stage "A," such that the relaxed inner diameter of the seal at Stage "B" is smaller than the outer diameter of the anode can at distal edge 40C, creating an initial interference condition. The interference condition is resolved primarily by resilient expansion of seal 64 by outward deflection of side wall 66 in response to advancing abutment element 80.

As indicated above, such interference is desirable for purposes of creating a leak-proof seal against leakage of electrolyte from the cell into which the anode subassembly is to be assembled. However, such interference is simultaneously undesirable because of the accompanying risks of damaging seal 64 in the process of assembling the anode can and the seal to each other, accompanied by ongoing sliding interference of distal edge 40C along inner surface 104 of side wall 66.

Between Stages "B" and "C," the relaxed inner diameter of the seal remains relatively constant such that as distal edge 40C advances along inner surface 104 of side wall 66, side wall 20C of the anode can exerts a constant pressure, at leading distal edge 40C, against inner surface 104 of side wall 66. Such constant pressure against side wall 66 as the distal edge progresses from Stage "B" to Stage "C" includes the ongoing risk of damaging/cutting side wall 66 at locations along the surface of the entire circumference of side wall 66 for the distance between Stages "B" and "C."

Notably, distal edge 40C is the distal edge of a thin piece of metal e.g. about 0.075 mm (0.003 inch) to about 0.250 mm (0.010 inch) thick, and can thus operate like a knife edge to cut into or through side wall 104. Especially any burr, deformity, irregularity, or other imperfection, at distal edge 40C can be readily and inadvertently applied to side wall 66 as the distal edge advances toward Stage "C." To the extent side wall 66 is cut or otherwise damaged, the risk of leakage of electrolyte from any cell made therewith is correspondingly increased.

Referring now to FIG. 7, for sake of discussion, the anode can in FIG. 7 is identical to the anode can in FIG. 6 except that the in-line edge region and accompanying distal edge 40C have been replaced by a reverse curl bottom edge 83 which is toed-in at its outer surface by 0.102 mm (0.004 inch). Seal 64 is the same as in FIG. 6. Thus, the clearance "CL2" between bottom edge 83 and inner surface 104 of side wall 66 at the top of seal 64 is 0.102 mm (0.004 inch) greater in FIG. 7 than in FIG. 6, which increase is generally illustrated at Stage "A."

At Stage "B," the diameter of the seal 64 is smaller than at Stage "A," such that the inner diameter of the seal at Stage "B" is smaller than the greatest diameter of side wall 20. Further at Stage "B," the circumferential outer surface of abutment element 80 of edge region 36, above bottom edge 83, and approximately at the joinder of abutment element 80 and intermediate region 38, is in abutment with inner surface 104 of side wall 66. Such surface-to-surface abutment, away from bottom edge 83, runs far less risk, namely substantially no risk, of damaging side wall 66, especially as compared to the risk of damage at leading edge 40C in FIG. 6.

Since abutment element 80 provides surface-to-surface abutment at its greater diameter spaced from, but in close proximity to, bottom edge 83, the portion of side wall 66 directly adjacent constant circumference element 82, and bottom edge 83, is progressively expanded in combination with advance of side wall 20, to a diameter greater than the diameter of constant circumference element 82 and bottom edge 83 as edge region 36 progresses to Stage "B," and from Stage "B" toward Stage "C." Thus, side wall 20, through abutment element 80, progressively expands seal side wall 66 adjacent, preferably ahead of, constant circumference element 82, preferably maintaining a respectively progressing clearance between constant circumference element 82, including bottom edge 83, and inner surface 104.

To the extent the abutment of abutment element 80 against seal 64 effectively spaces edge region 36 from seal 64, the risk of damaging seal side wall 66 is substantially eliminated. On the other hand, in the event there is some contact between edge region 36 and seal side wall 66, the folded-over arcuate curvature of the reverse curl structure at bottom edge 83 provides a less sharp leading edge than the prior art cut edge shown in FIG. 6, and displaces any burrs or other imperfections in cut free edge 87 away from the leading edge of the anode can, thereby further reducing potential of the anode can cutting the seal during assembly.

In both FIGS. 6 and 7, Stage "C" shows the unexpanded diameter of side wall 66 in solid outline, indicating the potential interference at constant circumference element 82, and the expanded inner and outer diameters "ED" in dashed outline, in order to clearly illustrate the interference between side wall 66 of the seal and side wall 20 of the anode can. However, contrary to prior art FIG. 6, in anode cans of the invention as illustrated in FIG. 7, bottom edge 83 is generally free from sharp edges such as from cutting the metal, and is spaced from inner surface 104 of side wall 66 along the entirety of the path of its advance along the inner surface of side wall 66, from the top edge of the side wall to its seating in groove 106 at foot 68.

At Stage "B," the distal edge 40C of the conventional anode can is in interfering contact with side wall 66C, while there remains a small clearance "CLB" between constant circumference element 82, including bottom edge 83, of the anode can of the invention and the inner surface of side wall 66. At Stage "C," the distal edge 40C of the conventional anode can remains in interfering contact with side wall 66C, while there remains a clearance "CLC" between constant circumference element 82 of the anode can of the invention and inner surface 104 of seal side wall 66.

In accommodation of the toed-in design of the anode can herein, the inner diameter of seal 64 at foot 68, and the diameters of groove 106, are adjusted inwardly an amount similar to the amount of the toeing-in. Thus, for example, where the diameter of the anode can at the distal edge has been toed in by 0.203 mm (0.008 inch), the maximum diameter of the seal at foot 68 is reduced by about 0.203 mm (0.008 inch) and the maximum diameter of groove 106 is correspondingly reduced. The minimum diameter of the groove may be similarly adjusted to accommodate thickness "T2." Thus, as illustrated in FIGS. 6 and 7, the toed-in design reduces the probability of bottom edge 83 damaging side wall 66 as the anode can is assembled to seal 64.

An additional benefit of the toed-in design resides in an interaction between anode can 14 at bottom edge 83, through seal 64, with cathode assembly 46. As illustrated in FIGS. 1 and 2, cathode assembly 46 is conventionally compressed to some degree between seal foot 68 and bottom 50 of the cathode can when the cell is assembled. Namely, the force urging the anode can and the cathode can together during cell assembly, is partially dissipated in compressing cathode assembly 46. As such force is applied to, and dissipated in, cathode assembly 46, the cathode assembly responds by "doming."

By "doming" is meant that the portion of the cathode assembly which is disposed inwardly of seal foot 68 is displaced slightly from a parallel orientation away from bottom 50 of the cathode can and toward top wall 18 of the anode can. While some such displacement is desirable in accommodating proper dimensioning of air reservoir 56, all such displacement is an intrusion into the anode volume is to contain the electrochemically reactive anode material. To the extent the dimension of the dome is greater than needed for proper formation of the air reservoir, the dome inappropriately occupies excess volume which is preferably occupied by anode material. Where the quantity of anode material is thus limited, so is the use life of the cell respectively limited.

Applicants have discovered that even the minor reduction in diameter of the anode can at bottom edge 83, as accorded by the toed-in edge region herein, provides improved control of the doming of the cathode assembly, whereby characteristic properties of cells made with such anode cans are more controllable and more predictable.

Increasing the amount of toe-in "T" provides at least two advantages. First, increasing the amount of toe-in facilitates assembling the anode can to the seal as illustrated in FIGS. 6 and 7. Second, increasing the amount of toe-in provides improved control over doming of the cathode assembly when the cell elements are brought together in assembly and closure of the cell.

However, increasing the amount of the toe-in also suggests at least two disadvantages. The greater the amount of toe-in, the more inner diameter "D5" of edge region 36 intrudes into what would otherwise be a larger volume in anode can 14 available to receive the electrochemically reactive anode material. As the amount of anode material is reduced, the use life of the cell is respectively, and undesirably, reduced.

Further, the greater the amount of toe-in, the greater the effect of force "F" on side wall 20. See FIG. 4. Thus, the greater the amount of toe-in, generally the greater the thickness "T1" which is required to support the toed-in structure. The greater thickness "T1" again undesirably reduces the anode volume.

Table 1 illustrates the percentage of anode volume lost when the anode can, thickness "T1" equal 0.152 mm (0.006 inch), is toed-in all around in amounts of about 0.038 mm (0.0015 inch) and about 0.150 mm (0.006 inch). The corresponding reductions in outer diameter at the edge regions were about double the above amounts, namely 0.076 mm (0.003 inch) and 0.300 mm (0.012 inch). Height "H" was about 0.86 mm (0.034 inch).

TABLE 1

PERCENT ANODE VOLUME CHANGE

| Cell Outer Diameter | Cell Height | .038 mm(.0015 inch) Toe-In "T" | | .150 mm(.006 inch) Toe-In "T" | |
| --- | --- | --- | --- | --- | --- |
| mm(inch) | mm(inch) | % Loss | % Retained | % Loss | % Retained |
| 5.72(.225) | 3.43(.135) | 1.33% | 98.67% | 4.32% | 95.68% |
| 7.75(.305) | 3.43(.135) | 1.01% | 98.99% | 3.33% | 96.67% |

TABLE 1-continued

PERCENT ANODE VOLUME CHANGE

| Cell Outer Diameter | Cell Height | .038 mm(.0015 inch) Toe-In "T" | | .150 mm(.006 inch) Toe-In "T" | |
|---|---|---|---|---|---|
| mm(inch) | mm(inch) | % Loss | % Retained | % Loss | % Retained |
| 7.75(.305) | 5.26(.207) | .63% | 99.37% | 2.09% | 97.91% |
| 11.5(.454) | 5.26(.207) | .41% | 99.59% | 1.38% | 99.62% |

Figure 3B:
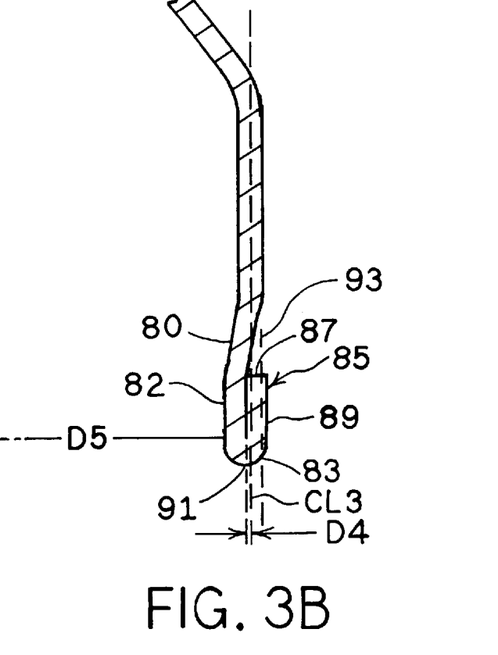

FIG. 3B illustrates an alternate embodiment of curled anode cans of the invention wherein the outer surface 89 of edge region 36 is disposed outwardly of outer surface 34 of intermediate region 38, while the inner surface of edge region 36 is disposed inwardly of inner surface 32 at intermediate region 38. Further, and as seen in FIG. 3B, the most remote locus 91, generally a line along curved bottom edge 83, is displaced inwardly of the centerline "CL3" through intermediate region 38 by a distance "D4." The effect of "D4" is to assist in controlling doming. The greater the dimension of "D4," the greater the control of the doming.

Further to the embodiment of FIG. 3B, the purpose of the outward displacement of outer surface 89 from intermediate region 38 is to increase the pressure against seal side wall 66, especially adjacent the cathode assembly in the cell. See FIG. 3C. Considering all interfacial contact between anode can 14 and seal 64, such increased pressure adjacent the cathode assembly is an especially effective locus for increasing the assembly pressure to thereby reduce the tendency of electrolyte to leak up side wall 66 and out of the cell.

Figure 3C:
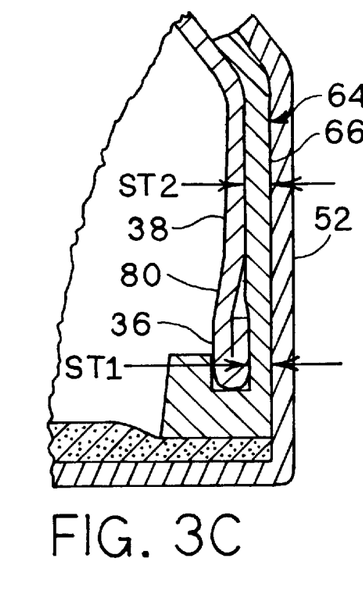
FIG. 3C is a fragmentary cross-section of the anode can as in FIG. 3B, and including illustration of the seal side wall and a portion of the cathode can, in an electrochemical cell assembly.

Note in FIG. 3C the relatively lesser thickness "ST1" of seal side wall 66 adjacent edge region 36 and the relatively greater thickness "ST2" of side wall 66 at intermediate region 38. The unstressed thickness of seal side wall 66 is relatively uniform from top to bottom. Thus, the relative thicknesses of seal side wall 66 at edge region 36 and intermediate region 38 result from respective amounts of pressure being exerted on side wall 66 at the respective locations. Thus, the lesser thickness adjacent edge region 36 is achieved by greater lateral compressive force of the anode can between edge region 36, seal 64, and side wall 52 of the cathode can than the respective pressures at intermediate region 38. By applying the greatest lateral pressure, across the thickness of the seal, against lower portions of side walls 52 and 66, the potential for leakage is effectively reduced, while still obtaining benefit of controlling doming due to inward displacement of edge 83.

Thus, the embodiment of FIGS. 3B and 3C provides the combination benefits, relative to prior art cells as in FIG. 6, of both improved control of doming and improved seal pressure against electrolyte leakage at reverse curl element 85.

While the extent by which surface 89 extends outwardly from intermediate region 38 is generally between 2% and 95% of the thickness "T1" of metal strip 86, typically the outward extension is within the range of about 5% to about 90%, preferably about 10% to about 50%, more preferably about 15% to about 35%, of thickness "T1." Contemplated and preferred thicknesses of metal strip 86 in this embodiment are as disclosed above, whereby the percentage of the internal anode volume retained is even higher than stated in Table 1, and can be readily calculated by those skilled in the art.

The combined conclusion gleaned from the embodiments of FIGS. 3A and 3B is that outer surface 89 should be displaced from the downward projection 93 of outer surface 34 from intermediate region 38. Where outer surface 89 is outward of projection 93, additional seal pressure is obtained at outer surface 89, in combination with some improvement in control of doming, as at FIGS. 3B and 3C. Where outer surface 89 is inward of projection 93, even greater control of doming is achieved. If special seal benefit as in FIG. 3B is of interest in combination with such inward displacement of the inner surface of the edge region to the degree shown in FIG. 3A, one or more additional outwardly-disposed folds of metal strip 86 may be created at edge region 36 thus to increase the outer perimeter of the edge region while maintaining the desired reduced inner perimeter of the edge region.

Those skilled in the art will now see that certain modifications can be made to the apparatus and methods herein disclosed with respect to the illustrated embodiments, without departing from the spirit of the instant invention. And while the invention has been described above with respect to the preferred embodiments, it will be understood that the invention is adapted to numerous rearrangements, modifications, and alterations, and all such arrangements, modifications, and alterations are intended to be within the scope of the appended claims.

To the extent the following claims use means plus function language, it is not meant to include there, or in the instant specification, anything not structurally equivalent to what is shown in the embodiments disclosed in the specification.

Having thus described the invention, what is claimed is:

1. An electrochemical cell, comprising:
    (a) an anode, including an anode can and electrochemically reactive anode material in said anode can, said anode can having a top wall, and a first side wall depending downwardly from said top wall, said first side wall having a first outer surface, said first side wall further having an edge region remote from said top wall, and an intermediate region between said edge region and said top wall, said first side wall comprising a curl at said edge region, a first portion of said first outer surface being defined on an outer portion of said curl, and an abutment element between said edge region and said top wall, said first portion of the first outer surface being displaced inwardly from a first downward projection of the first outer surface as defined at a maximum perimeter element of said intermediate region, the first downward projection being perpendicular to said top wall of said anode can;
    (b) a cathode, including a cathode can, and a cathode assembly in said cathode can, said cathode can having a bottom wall, and a second side wall extending upwardly from said bottom wall, said second side wall having an inner surface, said first side wall of said anode can being received inside said second side wall of said cathode can; and
    (c) a seal between said anode can and said cathode can at said first and second side walls.

2. An electrochemical cell as in claim 1, the entirety of said curl being displaced inwardly of the first outer surface as defined at the maximum perimeter element of said intermediate region, such that clearance between said first and second side walls at said edge region is greater than clearance between said first and second side walls at locations away from said edge region.

3. An electrochemical cell as in claim 1, said intermediate region of said first side wall being associated with a first full-size cross-section portion of an interior volume of said anode can, defined inwardly of said first side wall and between said top wall and said edge region, said edge region providing a second reduced-size cross-section portion of the interior volume of said anode can, said anode and said cathode being joined together with said seal between said first and second side walls and, in combination, defining a top and a bottom of said cell, and a cell height therebetween, said second side wall defining a maximum perimeter of said electrochemical cell thereabout, said cell height and said maximum perimeter, in combination, defining an overall volume of said electrochemical cell, said overall volume being about 0.50 cm$^3$ to about 0.60 cm$^3$, the fraction of the anode volume defined by said second portion being small compared to the fraction of the anode volume defined by said first portion, said toed-in edge region of said first side wall providing improved interaction with said seal and said cathode assembly while retaining at least 97% of the anode volume associated with a similar anode can wherein the entirety of said first side wall is associated with a full-size cross-section.

4. An electrochemical cell as in claim 3 wherein said toed-in edge region of said first side wall provides improved interaction with said seal and said cathode assembly while retaining at least 99% of the anode volume associated with a similar anode can wherein the entirety of said first side wall is associated with a full-size cross-section.

5. An electrochemical cell as in claim 3 wherein said toed-in edge region of said first side wall provides improved interaction with said seal and said cathode assembly while retaining at least 99.5% of the anode volume associated with a similar anode can wherein the entirety of said first side wall is associated with a full-size cross-section.

6. An electrochemical cell as in claim 1, said intermediate region of said first side wall being associated with a first full-size cross-section portion of an interior volume of said anode can, defined inwardly of said first side wall and between said top wall and said edge region, said edge region providing a second reduced-size cross-section portion of the interior volume of said anode can, said anode and said cathode being joined together with said seal between said first and second side walls and, in combination, defining a top and a bottom of said cell, and a cell height therebetween, said second side wall defining a maximum perimeter of said electrochemical cell thereabout, said cell height and said maximum perimeter, in combination, defining an overall volume of said electrochemical cell, said overall volume being about 0.20 cm$^3$ to about 0.30 cm$^3$, the fraction of the anode volume defined by said second portion being small compared to the fraction of the anode volume defined by said first portion, said toed-in edge region of said first side wall providing improved interaction with said seal and said cathode assembly while retaining at least 96% of the anode volume associated with a similar anode can wherein the entirety of said first side wall is associated with a full-size cross-section.

7. An electrochemical cell as in claim 6 wherein said toed-in edge region of said first side wall provides improved interaction with said seal and said cathode assembly while retaining at least 98.5% of the anode volume associated with a similar anode can wherein the entirety of said first side wall is associated with a full-size cross-section.

8. An electrochemical cell as in claim 6 wherein said toed-in edge region of said first side wall provides improved interaction with said seal and said cathode assembly while retaining at least 99% of the anode volume associated with a similar anode can wherein the entirety of said first side wall is associated with a full-size cross-section.

9. An electrochemical cell as in claim 1, said intermediate region of said first side wall being associated with a first full-size cross-section portion of an interior volume of said anode can, defined inwardly of said first side wall and between said top wall and said edge region, said edge region providing a second reduced-size cross-section portion of the interior volume of said anode can, said anode and said cathode being joined together with said seal between said first and second side walls and, in combination, defining a top and a bottom of said cell, and a cell height therebetween, said second side wall defining a maximum perimeter of said electrochemical cell thereabout, said cell height and said maximum perimeter, in combination, defining an overall volume of said electrochemical cell, said overall volume being about 0.12 cm$^3$ to about 0.20 cm$^3$, the fraction of the anode volume defined by said second portion being small compared to the fraction of the anode volume defined by said first portion, said toed-in edge region of said first side wall providing improved interaction with said seal and said cathode assembly while retaining at least 94% of the anode volume associated with a similar anode can wherein the entirety of said first side wall is associated with a full-size cross-section.

10. An electrochemical cell as in claim 9 wherein said toed-in edge region of said first side wall provides improved interaction with said seal and said cathode assembly while retaining at least 98% of the anode volume associated with a similar anode can wherein the entirety of said first side wall is associated with a full-size cross-section.

11. An electrochemical cell as in claim 9 wherein said toed-in edge region of said first side wall provides improved interaction with said seal and said cathode assembly while retaining at least 99% of the anode volume associated with a similar anode can wherein the entirety of said first side wall is associated with a full-size cross-section.

12. An electrochemical cell as in claim 1, said intermediate region of said first side wall being associated with a first full-size cross-section portion of an interior volume of said anode can, defined inwardly of said first side wall and between said top wall and said edge region, said edge region providing a second reduced-size cross-section portion of the interior volume of said anode can, said anode and said cathode being joined together with said seal between said first and second side walls and, in combination, defining a top and a bottom of said cell, and a cell height therebetween, said second side wall defining a maximum perimeter of said electrochemical cell thereabout, said cell height and said maximum perimeter, in combination, defining an overall volume of said electrochemical cell, said overall volume being about 0.06 cm$^3$ to about 0.12 cm$^3$, the fraction of the anode volume defined by said second portion being small compared to the fraction of the anode volume defined by said first portion, said toed-in edge region of said first side wall providing improved interaction with said seal and said cathode assembly while retaining at least 92% of the anode volume associated with a similar anode can wherein the entirety of said first side wall is associated with a full-size cross-section.

13. An electrochemical cell as in claim 12 wherein said toed-in edge region of said first side wall provides improved interaction with said seal and said cathode assembly while retaining at least 97% of the anode volume associated with a similar anode can wherein the entirety of said first side wall is associated with a full-size cross-section.

14. An electrochemical cell as in claim 12 wherein said toed-in edge region of said first side wall provides improved interaction with said seal and said cathode assembly while retaining at least 98.5% of the anode volume associated with a similar anode can wherein the entirety of said first side wall is associated with a full-size cross-section.

15. An electrochemical cell as in claim 1, said first outer surface at said edge region being displaced inwardly from said intermediate region a distance of about 0.025 mm to about 0.203 mm.

16. An electrochemical cell as in claim 1, said first side wall comprising a side wall structure between the first outer surface and an opposing surface, said first side wall structure having a thickness of about 0.075 mm to about 0.250 mm.

17. An electrochemical cell as in claim 1, said first side wall comprising a side wall structure between the first outer surface and an opposing surface, said first side wall structure having a thickness of about 0.090 mm to about 0.150 mm.

18. An electrochemical cell as in claim 1, said first side wall comprising a side wall structure between the first outer Surface and an opposing surface, said first side wall structure having a thickness of about 0.114 mm to about 0.140 mm.

19. An electrochemical cell as in claim 1, said first side wall comprising a side wall structure between the first outer surface and an opposing surface, the composition of said side wall structure comprising a substrate layer, and layers comprising nickel and copper on opposing sides of the substrate layer.

20. An electrochemical cell as in claim 19, said substrate layer comprising stainless steel.

21. An electrochemical cell, comprising:

(a) an anode, including an anode can and electrochemically reactive anode material in said anode can, said anode can having a top wall, and a first side wall depending downwardly from said top wall, said first side wall having a first outer surface, said first side wall further having an edge region remote from said top wall, and an intermediate region between said edge region and said top wall, said first side wall comprising a curl at said edge region, a first portion of said first outer surface being defined as an inner portion of said curl, said inner portion of said curl at said edge region being displaced inwardly from said intermediate region, an outer surface of said curl being displaced outwardly from said intermediate region;

(b) a cathode, including a cathode can, and a cathode assembly in said cathode can, said cathode can having a bottom wall, and a second side wall extending upwardly from said bottom wall, said second side wall having an inner surface, said first side wall of said anode can being received inside said second side wall of said cathode can; and (c) a seal between said anode can and said cathode can at said first and second side walls.

22. An electrochemical cell as in claim 21, said first portion of the outer surface on said curl being displaced outwardly of the first outer surface as defined at a maximum perimeter element of said intermediate region, said first side wall having a second inner surface opposite said first outer surface, said edge region comprising a second portion of the second inner surface, said second portion of the second inner surface being displaced inwardly of a second downward projection of the second inner surface as defined at the maximum perimeter element of said intermediate region.

23. An electrochemical cell as in claim 21, said intermediate region of said first side wall being associated with a first full-size cross-section portion of an interior volume of said anode can, defined inwardly of said first side wall and between said top wall and said edge region, said edge region providing a second reduced-size cross-section portion of the interior volume of said anode can, said anode and said cathode being joined together with said seal between said first and second side walls and, in combination, defining a top and a bottom of said cell, and a cell height therebetween, said second side wall defining a maximum perimeter of said electrochemical cell thereabout, said cell height and said maximum perimeter, in combination, defining an overall volume of said electrochemical cell, said overall volume being about 0.50 cm$^3$ to about 0.60 cm$^3$, the fraction of the anode volume defined by said second portion being small compared to the fraction of the anode volume defined by said first portion, said toed-in edge region of said first side wall providing improved interaction with said seal and said cathode assembly while retaining at least 97% of the anode volume associated with a similar anode can wherein the entirety of said first side wall is associated with a full-size cross-section.

24. An electrochemical cell as in claim 23 wherein said toed-in edge region of said first side wall provides improved interaction with said seal and said cathode assembly while retaining at least 99% of the anode volume associated with a similar anode can wherein the entirety of said first side wall is associated with a full-size cross-section.

25. An electrochemical cell as in claim 23 wherein said toed-in edge region of said first side wall provides improved interaction with said seal and said cathode assembly while retaining at least 99.5% of the anode volume associated with a similar anode can wherein the entirety of said first side wall is associated with a full-size cross-section.

26. An electrochemical cell as in claim 21, said intermediate region of said first side wall being associated with a first full-size cross-section portion of an interior volume of said anode can, defined inwardly of said first side wall and between said top wall and said edge region, said edge region providing a second reduced-size cross-section portion of the interior volume of said anode can, said anode and said cathode being joined together with said seal between said first and second side walls and, in combination, defining a top and a bottom of said cell, and a cell height therebetween, said second side wall defining a maximum perimeter of said electrochemical cell thereabout, said cell height and said maximum perimeter, in combination, defining an overall volume of said electrochemical cell, said overall volume being about 0.20 cm$^3$ to about 0.30 cm$^3$, the fraction of the anode volume defined by said second portion being small compared to the fraction of the anode volume defined by said first portion, said toed-in edge region of said first side wall providing improved interaction with said seal and said cathode assembly while retaining at least 96% of the anode volume associated with a similar anode can wherein the entirety of said first side wall is associated with a full-size cross-section.

27. An electrochemical cell as in claim 26 wherein said toed-in edge region of said first side wall provides improved interaction with said seal and said cathode assembly while retaining at least 98.5% of the anode volume associated with a similar anode can wherein the entirety of said first side wall is associated with a full-size cross-section.

28. An electrochemical cell as in claim 26 wherein said toed-in edge region of said first side wall provides improved interaction with said seal and said cathode assembly while retaining at least 99% of the anode volume associated with a similar anode can wherein the entirety of said first side wall is associated with a full-size cross-section.

29. An electrochemical cell as in claim 21, said intermediate region of said first side wall being associated with a first full-size cross-section portion of an interior volume of said anode can, defined inwardly of said first side wall and between said top wall and said edge region, said edge region providing a second reduced-size cross-section portion of the interior volume of said anode can, said anode and said cathode being joined together with said seal between said first and second side walls and, in combination, defining a top and a bottom of said cell, and a cell height therebetween, said second side wall defining a maximum perimeter of said electrochemical cell thereabout, said cell height and said maximum perimeter, in combination, defining an overall volume of said electrochemical cell, said overall volume being about 0.12 cm$^3$ to about 0.20 cm$^3$, the fraction of the anode volume defined by said second portion being small compared to the fraction of the anode volume defined by said first portion, said toed-in edge region of said first side wall providing improved interaction with said seal and said cathode assembly while retaining at least 94% of the anode volume associated with a similar anode can wherein the entirety of said first side wall is associated with a full-size cross-section.

30. An electrochemical cell as in claim 29 wherein said toed-in edge region of said first side wall provides improved interaction with said seal and said cathode assembly while retaining at least 98% of the anode volume associated with a similar anode can wherein the entirety of said first side wall is associated with a full-size cross-section.

31. An electrochemical cell as in claim 29 wherein said toed-in edge region of said first side wall provides improved interaction with said seal and said cathode assembly while retaining at least 99% of the anode volume associated with a similar anode can wherein the entirety of said first side wall is associated with a full-size cross-section.

32. An electrochemical cell as in claim 21, said intermediate region of said first side wall being associated with a first full-size cross-section portion of an interior volume of said anode can, defined inwardly of said first side wall and between said top wall and said edge region, said edge region providing a second reduced-size cross-section portion of the interior volume of said anode can, said anode and said cathode being joined together with said seal between said first and second side walls and, in combination, defining a top and a bottom of said cell, and a cell height therebetween, said second side wall defining a maximum perimeter of said electrochemical cell thereabout, said cell height and said maximum perimeter, in combination, defining an overall volume of said electrochemical cell, said overall volume being about 0.06 cm$^3$ to about 0.12 cm$^3$, the fraction of the anode volume defined by said second portion being small compared to the fraction of the anode volume defined by said first portion, said toed-in edge region of said first side wall providing improved interaction with said seal and said cathode assembly while retaining at least 92% of the anode volume associated with a similar anode can wherein the entirety of said first side wall is associated with a full-size cross-section.

33. An electrochemical cell as in claim 32 wherein said toed-in edge region of said first side wall provides improved interaction with said seal and said cathode assembly while retaining at least 97% of the anode volume associated with a similar anode can wherein the entirety of said first side wall is associated with a full-size cross-section.

34. An electrochemical cell as in claim 32 wherein said toed-in edge region of said first side wall provides improved interaction with said seal and said cathode assembly while retaining at least 98.5% of the anode volume associated with a similar anode can wherein the entirety of said first side wall is associated with a full-size cross-section.

35. An electrochemical cell as in claim 21, said first outer surface at said edge region being displaced inwardly a distance of about 0.025 mm to about 0.203 mm.

36. An electrochemical cell as in claim 21, said first side wall comprising a side wall structure between the first outer surface and an opposing surface, said first side wall structure having a thickness of about 0.075 mm to about 0.250 mm.

37. An electrochemical cell as in claim 21, said first side wall comprising a side wall structure between the first outer surface and an opposing surface, said first side wall structure having a thickness of about 0.090 mm to about 0.150 mm.

38. An electrochemical cell as in claim 21, said seal having a lesser thickness between said anode can and said cathode can adjacent said edge region than adjacent said intermediate region.

39. An electrochemical cell as in claim 21, said anode can and said cathode can, in combination, exerting greater lateral compressive forces on said seal adjacent said edge region than adjacent said intermediate region.

* * * * *